(12) United States Patent
Zbiral et al.

(10) Patent No.: US 12,100,857 B2
(45) Date of Patent: Sep. 24, 2024

(54) BATTERY DEGASSING UNIT AND BATTERY HOUSING

(71) Applicant: MANN+HUMMEL GmbH, Ludwigsburg (DE)

(72) Inventors: Robert Zbiral, Marbach (DE); Markus Hanselmann, Lauffen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 127 days.

(21) Appl. No.: 17/573,746

(22) Filed: Jan. 12, 2022

(65) Prior Publication Data
US 2022/0223974 A1    Jul. 14, 2022

(30) Foreign Application Priority Data

Jan. 14, 2021  (DE) ..................... 10 2021 100 636.8

(51) Int. Cl.
*H01M 50/30* (2021.01)

(52) U.S. Cl.
CPC ...... *H01M 50/394* (2021.01); *H01M 2220/20* (2013.01)

(58) Field of Classification Search
None
See application file for complete search history.

(56) References Cited

U.S. PATENT DOCUMENTS

| 5,538,807 | A | 7/1996 | Hagiuda |
| 9,627,666 | B2 | 4/2017 | Baldwin |
| 2002/0031699 | A1 | 3/2002 | Hampe et al. |
| 2009/0120949 | A1 | 5/2009 | Mashiko |
| 2009/0266815 | A1 | 10/2009 | Lauk et al. |
| 2010/0136386 | A1 | 6/2010 | Holung et al. |
| 2010/0227544 | A1 | 9/2010 | Furuyama et al. |

(Continued)

FOREIGN PATENT DOCUMENTS

| CN | 107178638 A | * 9/2017 | ......... F16K 17/1626 |
| CN | 208298910 U | 12/2018 | |

(Continued)

OTHER PUBLICATIONS

English translation of Pemsel et al. (DE-102016009698-A1). (Year: 2016).*

(Continued)

*Primary Examiner* — Haroon S. Sheikh
*Assistant Examiner* — Drew C Newman

(57) ABSTRACT

A battery degassing unit for a battery housing has a base body that has a gas passage opening and is to be connected fluid-tightly to a pressure compensation opening of the battery housing. A first filter covers the gas passage opening at an inner side of the base body. The first filter is a separation grid with first grid openings. A second filter is a separation grid arranged between first filter and inner side of the base body and has second grid openings. The base body has fastening regions for fastening the battery degassing unit to the battery housing. One of the first and second filters completely engages across the gas passage opening. One of the first and second filters is a corrugated filter so that a length extension in a stretched state in at least one direction is at least 1.3 times as large as in a corrugated state.

25 Claims, 12 Drawing Sheets

(56) References Cited

U.S. PATENT DOCUMENTS

| | | | |
|---|---|---|---|
| 2011/0239892 A1* | 10/2011 | Von Breitenbach | B01D 45/06 |
| | | | 55/414 |
| 2012/0070703 A1 | 3/2012 | Wahl et al. | |
| 2012/0315514 A1 | 12/2012 | Guo | |
| 2018/0292020 A1 | 10/2018 | Kleinke et al. | |
| 2022/0140432 A1* | 5/2022 | Chen | H01M 50/209 |
| | | | 429/53 |

FOREIGN PATENT DOCUMENTS

| | | | | |
|---|---|---|---|---|
| CN | 210467960 U | * | 5/2020 | |
| DE | 102011015925 A1 | | 10/2012 | |
| DE | 102012022346 A1 | | 5/2014 | |
| DE | 102016009698 A1 | | 4/2017 | |
| DE | 102018114439 A1 | | 12/2019 | |
| DE | 202020101150 U1 | | 3/2020 | |
| DE | 102019112432 A1 | | 11/2020 | |
| EP | 0639862 A1 | | 2/1995 | |
| EP | 1909548 A1 | | 4/2008 | |
| EP | 2503199 A1 | | 9/2012 | |
| WO | WO-2021169494 A1 | * | 9/2021 | H01M 10/613 |

OTHER PUBLICATIONS

English translation of Li et al. (CN-210467960-U). (Year: 2020).*
English translation of Xu et al. (CN-107178638-A). (Year: 2017).*

* cited by examiner

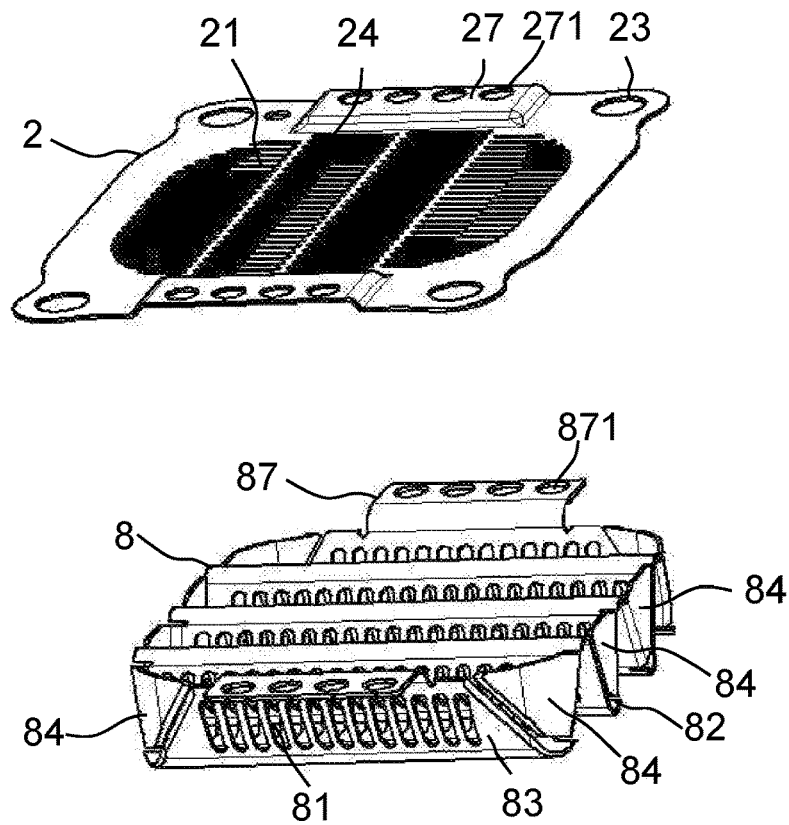
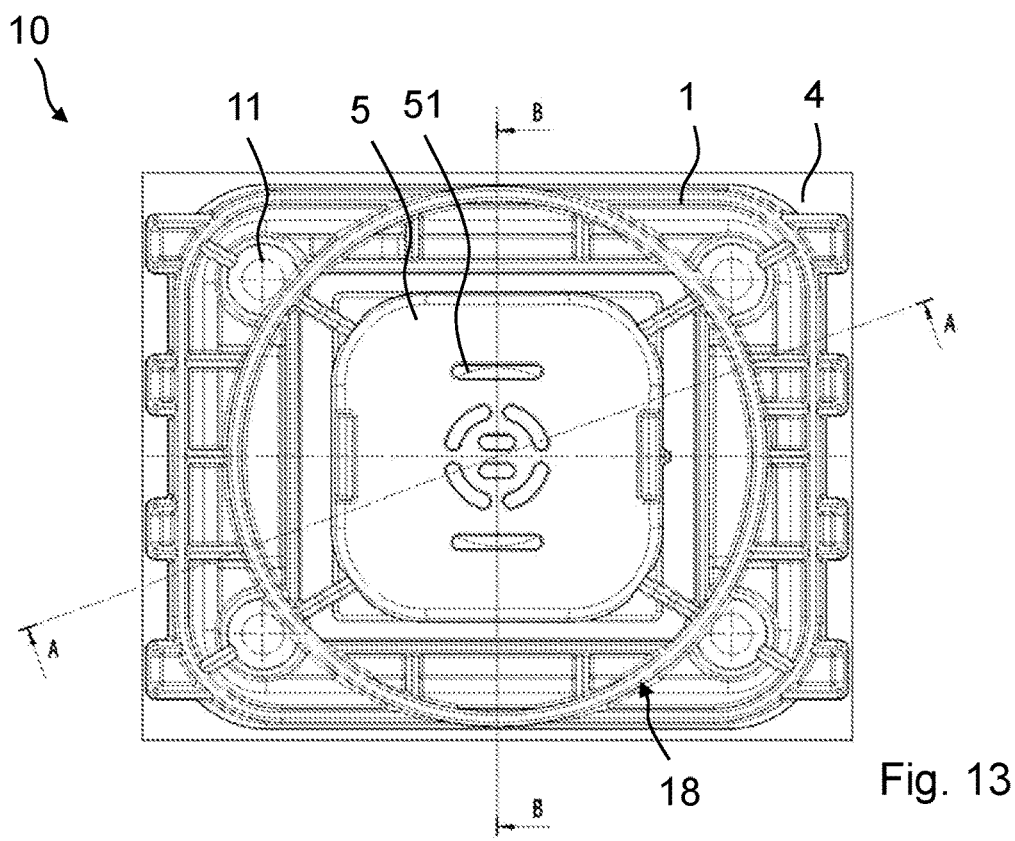
Fig. 12
Fig. 13

BATTERY DEGASSING UNIT AND BATTERY HOUSING

CROSS-REFERENCE TO RELATED APPLICATION

This application claims a priority date of 14 Jan. 2021 based on prior filed German patent application No. DE 10 2021 100 636.8, the entire contents of the aforesaid German patent application being incorporated herein by reference, to the fullest extent permitted by the law.

TECHNICAL FIELD

The invention concerns a battery degassing unit and a battery housing, in particular of a traction battery of a motor vehicle.

BACKGROUND OF THE INVENTION

Housings for receiving electronic components such as, for example, battery cells and the like cannot be closed off completely gas-tightly relative to the environment because, on the one hand, due to temperature fluctuations, for example, by heat introductions by charging or discharging battery cells, and, on the other hand, due to naturally occurring air pressure fluctuations, in particular in mobile systems, a gas exchange between interior and exterior space must be made possible in order to prevent impermissible mechanical loads of the housing, in particular bursting or bulging of the housing.

However, it is likewise important that penetration of foreign bodies, dirt, and moisture in form of liquid water is effectively prevented. Therefore, pressure compensation devices are known which comprise semipermeable membranes, for example, of extruded polytetrafluoroethylene (PTFE) that are gas-permeable but liquid-impermeable.

DE 102012022346 B4 discloses a battery housing that comprises a housing enclosing a housing interior with a housing opening that is covered by means of a membrane carrier in form of a housing cover that is provided for degassing and for substantially water-tight sealing of the housing interior against ingress of water, preferably also other liquids, and that contains a carrier body that comprises a gas passage opening extending continuously between a carrier body inner side and a carrier body outer side for discharging gases or for pressure compensation. The gas passage opening is completely covered by a semipermeable membrane. The carrier body, the membrane, and the housing are air-tightly or gas-tightly connected that substantially no water and preferably also no air or no gas can reach the housing interior through the housing opening.

SUMMARY OF THE INVENTION

It is an object of the invention to provide a battery degassing unit for a battery, in particular for a traction battery of a motor vehicle, that is distinguished in that it effectively retains, in the interior of the battery housing, hot particles in the case of a cell defect without excessively increasing a pressure loss in the emergency degassing path.

A further object is to provide an battery housing with such a battery degassing unit.

The aforementioned object is solved according to an aspect of the invention by a battery degassing unit for a battery, in particular for a traction battery of a motor vehicle, with a base body connectable fluid-tightly to a rim of a pressure compensation opening of the battery housing and comprising at least one gas passage opening that is covered at the inner side by a first filter that comprises a plurality of first grid openings and by a second filter that is arranged between the first filter and the inner side of the base body and that comprises a plurality of second grid openings, wherein at least one of the filters extends completely across the gas passage opening, wherein the base body comprises at least one fastening means region of action which is configured for fastening the battery degassing unit to the battery housing, wherein at least one of the two filters is embodied with multiple corrugations so that a length extension in the stretched state in at least one direction is at least 1.3 times as large as in the corrugated state.

Preferably, a length extension of the first filter in the stretched state in at least one direction is even at least 1.3 times, in particular 1.5 times, in particular 1.7 times, in particular 2.0 times, as large as in the corrugated state.

In other words, the first filter is arranged internally adjacent to the second filter and the inner side of the base body externally adjacent to the second filter.

The further object is solved according to a further aspect of the invention by a battery housing, in particular of a traction battery of a motor vehicle, that comprises at least one housing wall with a pressure compensation opening, wherein preferably battery cells can be arranged in the battery housing, wherein the pressure compensation opening is closed off by such a battery degassing unit.

Beneficial configurations and advantages of the invention result from the further claims, the description, and the drawing.

According to an aspect of the invention, a battery degassing unit for a battery housing, in particular for a battery, in particular for a traction battery of a motor vehicle, is proposed, with a base body, connectable fluid-tightly to a rim of a pressure compensation opening of the battery housing and comprising at least one gas passage opening that is covered at the inner side by a first filter that comprises a plurality of first grid openings and by a second filter that is arranged at a side opposite the inner side of the first filter and that comprises a plurality of second grid openings. At least one of the filters extends completely across the gas passage opening. The base body comprises at least one fastening means region of action that is configured for fastening the battery degassing unit to the battery housing. In this context, at least one of the two filters is corrugated such that a length extension in the stretched state in at least one direction is at least 1.3 times as large as in the corrugated state.

The battery degassing unit is in particular provided as a pressure compensation device with integrated emergency opening for a housing of a high voltage battery through which fluids (gases) can flow for pressure compensation and particularly in case of a collapsing battery cell, the so-called thermal runaway. In this context, particles of a defined magnitude are to be separated however in case of a thermal runaway so that they cannot reach the environment. For this purpose, at least two filter stages for relatively large particles and relatively small particles are provided. In order not to impair the outflow of the gas in an impermissible way by particles that have deposited on the respective filter, which would result in an impermissibly high pressure increase in the interior of the housing, the surface of at least one filter stage is embodied with corrugations according to the invention. The lateral walls of the corrugated filter stage can be integrated directly at this component or, in combination with a further filter stage, can be formed by the latter at least partially or can be formed at least partially by other contours that are provided at the battery housing. The side walls can be of a closed configuration or can also enlarge by corresponding openings the surface of the corrugated filter element with its filtration stage.

Due to the corrugated embodiment of at least one filter stage, for example, of the first filter arranged at the inner side, the surface thereof can be significantly enlarged while having approximately the same space requirement. Should partial areas of the filter stage become clogged by particle accumulations, the thus induced pressure loss increase would be, in comparison, significantly smaller than in case of a filter element of the same size that is substantially flat.

By a separation stage of corrugated embodiment, its surface can be significantly increased, for example, by more than 50%, without significantly enlarging the existing space requirement in this context. Beneficially, the opening in the battery housing must not even be changed or enlarged for this purpose.

The determination of the "corrugated length" and "stretched length" of the first filter is realized—viewed in cross section and in an exemplary way for an isolated corrugation—in particular starting at locations with minimal deformation or bending radii that adjoin a respective corrugation or folding at both sides. In particular, such locations with minimal deformation or bending radii are a section on the course of the cross section contour of the first filter where the slope of the contour equals zero. When, in cross section, the first filter at edges comprises unfolded regions, the latter are not to be take into consideration for determining the lengths.

The first filter serves moreover as an ingress protection into an interior of the battery housing so that objects such as, for example, screwdrivers or the like cannot reach the interior. This is particularly important because traction batteries for vehicles are often operated in the high-voltage range and this presents dangers. The first filter can comprise a plurality of spaced-apart grid stays whose minimum distance is to be selected such that an ingress can be reliably prevented. The grid stays can be arranged in a right angle pattern or as a combination of circumferential and radially extending grid stays.

The dimensions of the first grid openings of the first filter are to be selected such that a proportion as large as possible of a particle fraction which is produced in case of a battery cell defect can be retained thereby in order to prevent that they reach the environment. The particles that are produced in case of a cell defect are glowing metal and/or alkali metal particles which, together with combustible gases that are possibly also produced in case of a cell defect, can represent an ignition source. The dimensions of the first grid openings of the first filter are selected, for example, such that a certain mass proportion of the particles, for example >75%, can be retained. For this purpose, the first filter is manufactured of a sufficiently thermally resistant material; preferably, the melt temperature of the material is above 800° C., in particular above 1,000° C.

The first filter can therefore preferably comprise or be comprised of a metal. A first filter of metal has the advantage that, even after an exposure to high temperature, the protection and separation function is maintained; therefore, it is used preferably in accordance with the present invention. Alternatively, the first filter can comprise or be comprised of a plastic material, preferably polypropylene and/or polybutylene terephthalate, each preferably comprising reinforcement fibers, in particular glass fibers.

The base body can be comprised substantially of plastic material, in particular thermoplastic plastic material, and in particular can be injection molded. Preferred materials are polypropylene, polybutylene terephthalate or polyamide, each comprising reinforcement fibers, in particular glass fibers.

Preferably, the surface area that is spanned by the first filter is larger than a cross section of the gas passage opening which has the advantage that the surface area that is available for particle separation is enlarged. This contributes to the first filter not so quickly blocking (clogging) in case of gas flows that are heavily loaded with particles. The devices known from the prior art with only a support grid do not realize this advantage because here the flow cross section available for particle separation is limited by the dimensions of the gas passage opening.

In that in accordance with the invention at least one of the two filters is of a corrugated configuration and therefore comprises an enlarged surface for separation of particles, a pressure loss as small as possible is ensured in the emergency degassing situation.

According to an embodiment, the grid openings of the filter with multiple corrugations can also be arranged in at least one region of an inversion of direction of a cross section of the filter with multiple corrugations. "Region of an inversion of direction" means in particular a region of the filter with multiple corrugations in which its structure is bent, folded or deformed in another way in order to obtain a structure with multiple corrugations. This entails the technical advantage that such structurally determined regions advantageously can be used for filtration and not merely do not contribute anything to the particle separation as filtration-inactive, fluid-impermeable "residual structures".

According to a beneficial embodiment of the battery degassing unit, the corrugated filter can be surrounded at least in sections thereof by side walls that cover lateral openings of the corrugated filter toward the battery housing. In this way, a high separation efficiency of the corrugated filter can be ensured. In particular in case of a folded filter, the relatively large openings at the end faces of the folds can be effectively sealed in this way. The side walls can be formed, for example, at the respective other one of the two filters which is not corrugated.

According to a beneficial embodiment of the battery degassing unit, the side walls can have openings which enable at least gas passage. Smaller openings in the size of the grid openings of the corrugated filter can thus contribute additionally to the separation of particles and can still be permeable for fluids such as gases.

According to a beneficial embodiment of the battery degassing unit, the side walls can be configured at least in section at the first filter. The first filter can be embodied so as to be folded beneficially in such a way that the openings, normally produced at the end faces of the folds when folding, are sealed by the filter medium itself. The side walls can thus be formed directly at the filter that is also corrugated.

According to a beneficial embodiment of the battery degassing unit, the side walls can be configured at least in sections at the base body. In this alternative embodiment, the side walls for sealing the folded filter can also be formed as one piece together with the base body. In this way, an effective sealing action of the corrugated filter toward the base body can be achieved in a beneficial manner.

According to a beneficial embodiment of the battery degassing unit, the corrugated filter can have folds parallel or equidistantly arranged relative to each other whose fold edges are arranged parallel to the gas passage opening. In this way, an effective surface enlargement of the filter can be achieved in a simple manner while at the same time minimal extra installation space is required. Fold edges means herein the extension of the fold tips and fold bases.

According to a beneficial embodiment of the battery degassing unit, the first grid openings can be provided for separation of larger particles and the second grid openings for separation of smaller particles that are smaller than the larger particles. In this way, a preseparation of large particles can be achieved which prevents that the second filter will become clogged too quickly. In this way, an unfavorable increase of the pressure loss by clogged filters in the emergency degassing situation can be avoided.

According to a beneficial embodiment of the battery degassing unit, adjacent to the second filter toward the outer side a semipermeable membrane can be present which enables passage of gaseous media from an environment into the battery housing and in reverse, but prevents passage of liquid media and/or solids. In this context, the second filter can form particularly a membrane support device which engages across the gas passage opening at least partially.

Advantageously, the second filter as a membrane support device can be present at a distance from the semipermeable membrane and can be embodied to be fluid-permeable, preferably as a grid section with a plurality of second grid openings.

According to a beneficial embodiment of the battery degassing unit, the membrane can be present at the inner side of the base body and can be engaged from behind by the second filter at least partially so that the latter supports the membrane against external pressure effects (e.g. against water pressure in the case of driving through water and/or use of cleaning devices in vehicles) and prevents impermissible deformations.

A contact or connection of the membrane at the inner side of the base body has the advantage that the membrane upon inner pressure action is held quasi with form fit in relation to the base body and the connection (welding, gluing or the like) is not loaded by tension, which can be important in particular when using PTFE materials that are already difficult to join. In order to prevent also in case of inner pressure effects an impermissibly strong bending or "bulging" of the membrane which can lead to its destruction, the base body additionally can comprise an outer support grid for the membrane which externally spans the membrane surface at least partially but is fluid-permeable with a sufficiently large surface proportion in order to enable gas exchange in normal operation.

All materials that have a high gas permeability for venting in normal operation and a sufficiently high water permeability can be used for the semipermeable membrane. As preferred material for the semipermeable membrane, polytetrafluoroethylene (PTFE) can be used. The semipermeable membrane comprises an average pore size that can lie between 0.01 micrometers and 20 micrometers. The porosity is preferably at approximately 50%; the average pore size preferably amounts to approximately 10 micrometers.

The semipermeable membrane can be preferably designed as a film-like or film-shaped or a disk-shaped thin membrane. The gas-permeable membrane comprises a membrane surface effective for gas permeation which can comprise preferably a rectangular or a round outer contour at its outer circumference. It is however understood that the outer circumference of the membrane can also be designed differently. The membrane is preferably a thin flat membrane whose membrane surfaces that are effective for gas passage and face away from each other are substantially parallel to each other and preferably substantially planar.

The membrane thickness of the membrane is very much smaller than its other outer dimensions. The membrane can have a minimum width and/or a minimum length or a minimum outer diameter of equal to or larger than 20 mm, preferably of equal to or larger than 30 mm, in particular of equal to or larger than 40 mm. The membrane thickness can be at least 20 times, preferably at least 40 times, in particular at least 100 times, smaller than the minimum width and/or the minimum length or the minimum outer diameter of the membrane. The membrane thickness can amount to 1 micrometer to 5 millimeters, wherein a membrane thickness of 0.1 to 2 mm, in particular 0.15 to 0.5 mm, is preferred.

Moreover, the membrane can be connected circumferentially to a rim of the gas passage opening of the base body, in particular welded, preferably at an inner side of the base body. Alternatively, the membrane can also be held by gluing or friction fit, for example, clamped. The porous PTFE membrane materials described herein as preferred can be welded or materially fused in other ways without problem to a plastic base body.

According to a beneficial embodiment of the battery degassing unit, the first filter can be connected particle-tightly to the base body. Alternatively or additionally, a surface area that is spanned by the first filter can be larger than a cross section of the gas passage opening.

According to a beneficial embodiment of the battery degassing unit, the dimensions of the grid openings of the first filter in at least one direction of extension can be smaller than 3.0 mm, preferably smaller than 2.0 mm, even more preferred smaller than 1.5 mm. According to findings of the applicants, the aforementioned requirements with regard to a gravimetric separation performance can be realized for such a dimensioning.

The second filter is also embodied to be fluid-permeable, preferably as a grid section with a plurality of second grid openings. This has the technical advantage that the cross section of the second filter, in particular in the emergency degassing situation, can also be flowed through which reduces the pressure loss further and increases thus the speed of the pressure relief in the housing.

According to a beneficial embodiment of the battery degassing unit, the dimensions of the second grid openings of the second filter in at least one extension direction can be smaller than the dimensions of the first grid openings of the first filter. For example, the dimensions of the grid openings of the second filter can be at least 4 times, preferably at least 6 times, larger than the dimensions of the grid openings of the first filter in the direction of extension with the smallest dimension. This is based on the idea that in this way a multi-stage particle separation can be realized wherein larger particles can be separated by the first filter than by the second filter. This increases the overall separation performance and reduces the pressure loss in operation (emergency degassing situation).

According to a beneficial embodiment of the battery degassing unit, the first filter can comprise a filter medium that comprises preferably a grid material, in particular a wire mesh and/or a nonwoven material. In this context, the filter medium can preferably comprise or be comprised of a metallic material. The filter medium in this context can be supported by support grid stays of the first filter which, in combination with a filter medium, can have a significantly larger distance from each other than in an embodiment without filter medium; the distances between the support grid stays can amount to, for example, several millimeters, for example, 1.5 mm to 35 mm, preferably 2 mm to 30 mm. The opening cross sections in regard to the separation are determined in this case by the dimensions of the openings of the grid material and/or by the pore sizes of the nonwoven material.

According to a beneficial embodiment of the battery degassing unit, the first filter can be connected to the second filter, in particular can be welded to or snapped onto the second filter. The first filter can be detachably or non-detachably connected to the second filter. For ensuring a particle seal-tightness as good as possible of the connection of first filter and second filter, the second filter can engage radially outwardly, at least partially circumferentially, across the first filter. In a preferred embodiment, in the region of the radially outer circumference snap-on means are provided. Alternatively, the two filters in the region of the radially outer engagement can be connected to each other by means of a welding method, in particular a laser spot welding method.

According to a beneficial embodiment of the battery degassing unit, a distance between the first filter and the second filter in the region of the center of the gas passage opening can amount to at least 0.2 mm, preferably at least 0.7 mm, wherein even greater values in regard to a reduced pressure loss are advantageous.

Advantageously, the fastening means region of action of the base body can comprise a bore, in particular a blind bore, that is open toward the inner side and/or outer side of the base body. A corresponding fastening means can be brought into engagement with this bore, in particular from a housing interior or housing exterior of the battery housing. In the fastening means region of action, in particular a metallic connection element, preferably a thread engagement means, for example, a thread bushing or a sheet metal nut, can be present.

According to a beneficial embodiment of the battery degassing unit, the first filter can be designed as a sheet metal part, in particular stamped sheet metal part. This enables an inexpensive manufacture even when used in mass production. Alternatively or additionally, the openings of the first filter can also be produced by other methods, for example by (laser) cutting. Preferably, the first filter has at least one push-through opening which is aligned with the at least one blind bore of the base body. Through the push-through opening, a screw can be guided for fastening the battery degassing unit to the battery housing and, according to this embodiment, also securely holds fast the first filter in relation to the opening of the battery housing in case of a thermal exposure.

According to a beneficial embodiment of the battery degassing unit, the first filter can comprise at least one fastening tab. The fastening tab can extend preferably laterally. In this connection, by means of the fastening tab the first filter can be indirectly or directly connected to the base body. The fastening tab can extend in particular in radial direction away from the grid body of the first filter. The fastening tab can furthermore be suitable to connect the first filter directly to the base body. A direct connection of the first filter, which is in particular metallic, to the base body has the advantage that the first filter after a severe thermal exposure (e.g., fire and/or cell defects) remains safely attached in relation to the base body and can continue to provide its separation function. For example, the first filter can be fixedly connected to the base body via bores of the fastening tabs by means of weld spots.

The second filter can also comprise fastening tabs which comprise bores by means of which the first filter and the second filter together can be fixedly connected with the weld spots of the base body.

Advantageously, the battery degassing unit can comprise a cover hood which is connected externally to the base body. Preferably, the cover hood can comprise at least one venting opening.

The cover hood ensures that the membrane cannot be damaged from the exterior by foreign bodies, for example, pointed objects such as screwdrivers or the like, or by means of high-pressure cleaners and/or steam cleaners and thus contributes effectively to a high IP protection class.

Advantageously, the cover hood can be attached to the base body by means of a locking element engagement. The locking element engagement in this context can be realized, for example, at the outer circumference of the base body or, in a broader sense, at the end face at its outer side. However, for attachment of the cover hood at the base body, also other fastening means are conceivable, for example, form fit or friction fit fastening means, for example, screws or clips, but also by material-fused connections, in particular (friction) welding.

As materials for the base body and/or the cover hood, in particular plastic materials are conceivable, preferably thermoplastic plastic materials that can be processed by injection molding. Preferably, the base body and/or the cover hood is comprised of polypropylene, polybutylene terephthalate or polyamide, each optionally comprising reinforcement fibers, in particular glass fibers, or comprises at least one of these materials.

According to a beneficial embodiment, the battery degassing unit can comprise a housing seal which circumferentially surrounds the gas passage opening of the base body at the inner side. The housing seal can be configured as an axial or radial seal, i.e., in particular can be present at an end face (in the case of the axial seal) or at a circumferential wall surface (in the case of the radial seal). The housing seal can be designed as an O-ring or shaped seal, which is received in a corresponding groove of the base body or which is configured as a molded-on seal component. An arrangement of the housing seal in axial configuration is preferred wherein, particularly preferred, the housing seal surrounds a bayonet connection means which in particular projects away axially. The housing seal can be configured in particular also as a shaped seal with a non-circular cross section, in particular stretched in longitudinal direction.

In embodiments, it can be provided that a direction in which the second grid openings of the second filter have their greatest dimension are extending at an angle to a direction in which the first grid openings of the first filter have their greatest dimension, wherein the angle preferably amounts to 90°. In this way, the separation of real particles which have no ideal spherical shape can be improved.

According to a beneficial embodiment, the battery degassing unit can comprise an emergency degassing spike which extends externally in axial direction toward the membrane and whose tip in a rest state is positioned at a predetermined distance from an outer membrane surface, wherein the emergency degassing spike is formed in particular at the base body or at a cover hood. The emergency degassing spike in the rest state (no differential pressure load) is arranged at a predetermined distance from the membrane surface. Under pressure load (relative inner excess pressure), the membrane will bulge in the direction toward the exterior space and, when reaching a limit pressure, will contact the tip of the emergency degassing spike. Due to its tip, the emergency degassing spike then generates a targeted weakening of the membrane so that the latter ruptures. This serves for securing an emergency degassing function that reacts as quickly as possible which is important in order to be able to ensure that the housing structure remains intact in case of a sudden internal pressure increase in the battery housing. By a variation of the distance of the tip of the emergency degassing spike from the membrane surface, the emergency degassing pressure is adjustable.

A further aspect of the invention concerns a battery housing, in particular a traction battery of a motor vehicle. The battery housing has at least one housing wall with a pressure compensation opening wherein preferably battery cells can be arranged in the battery housing and wherein the pressure compensation opening is closed off by a battery degassing unit according to the invention so that a gas exchange between an interior of the battery housing and the environment is possible but the ingress of moisture, dirt, and foreign bodies is effectively prevented.

In this context, mounting of the battery degassing unit is provided in particular such that the latter by at least one fastening means, in particular a screw, is connected to a wall of the battery housing wherein the fastening means is in engagement with the fastening means region of action of the base body. Due to the screw connection, the sealing pretensioning forces required for compression of the housing seal are produced. The screw connection can be in particular realized from the interior of the battery housing. Of course, also other embodiments are encompassed by the invention in which the screw connection of the battery degassing unit to the battery housing is realized from the exterior side.

Particularly preferred, the first filter is secured indirectly or directly with form fit between the wall of the battery housing and the base body of the battery degassing unit, essentially clamped sandwich-like therebetween. In this way, it is enabled that the first filter in the case of a thermal exposure also remains fastened reliably in regard to the opening of the battery housing.

Finally, at an outer side the housing wall can comprise a seal surface which circumferentially surrounds the pressure compensation opening and at which the battery degassing unit is resting in a mounted state of the housing seal. The seal surface is preferably embodied as a region of the wall of the battery housing with deviations as little as possible with respect to evenness and with minimal roughness. Suitably, the battery housing or at least its wall comprises or is comprised of a metal material so that, with respect to the aforementioned properties, the seal surface can be obtained simply by mechanical machining.

BRIEF DESCRIPTION OF THE DRAWINGS

Further advantages result from the following drawing description. In the drawings, embodiments of the invention are illustrated. The drawings, the description, and the claims contained numerous features in combination. A person of skill in the art will consider the features expediently also individually and combine them to expedient further combinations.

FIG. 12 shows a first filter and a second filter of the battery degassing unit according to FIG. 10 in isometric illustration.

FIG. 13 shows a plan view of the battery degassing unit according to FIG. 10 viewed from an exterior side of the base body with indicated section planes A-A and B-B.

DESCRIPTION OF PREFERRED EMBODIMENTS

Figure 1:
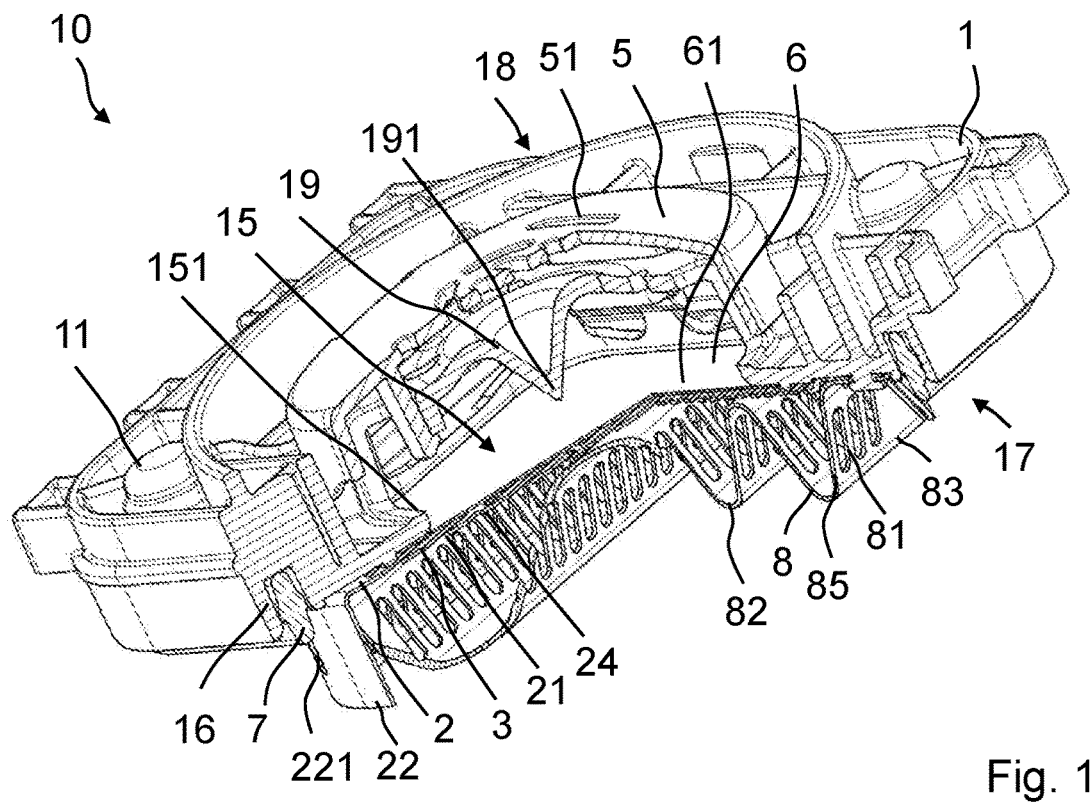
FIG. 1 shows an isometric section view of a battery degassing unit according to an embodiment of the invention.
Figure 2:
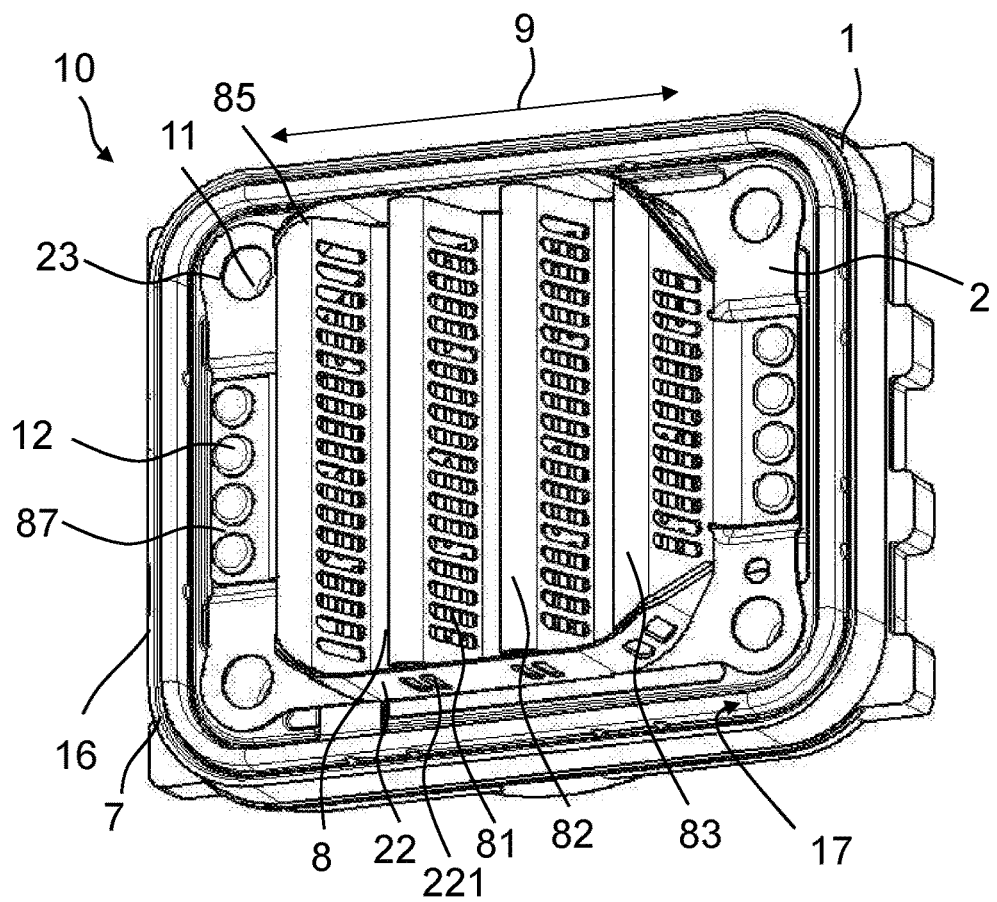
FIG. 2 shows an isometric view of the battery degassing unit according to FIG. 1 viewed from an inner side of a base body.

In the Figures, same or same-type components are identified with same reference characters. The Figures show only examples and are not to be understood as limiting.

In FIGS. 1 to 9, a first embodiment of the battery degassing unit 10 is illustrated. FIG. 1 shows an isometric section view of the battery degassing unit 10 while in FIG. 2 an isometric view of the battery degassing unit 10 is illustrated viewed from an inner side 17 of a base body 1.

Figure 3:
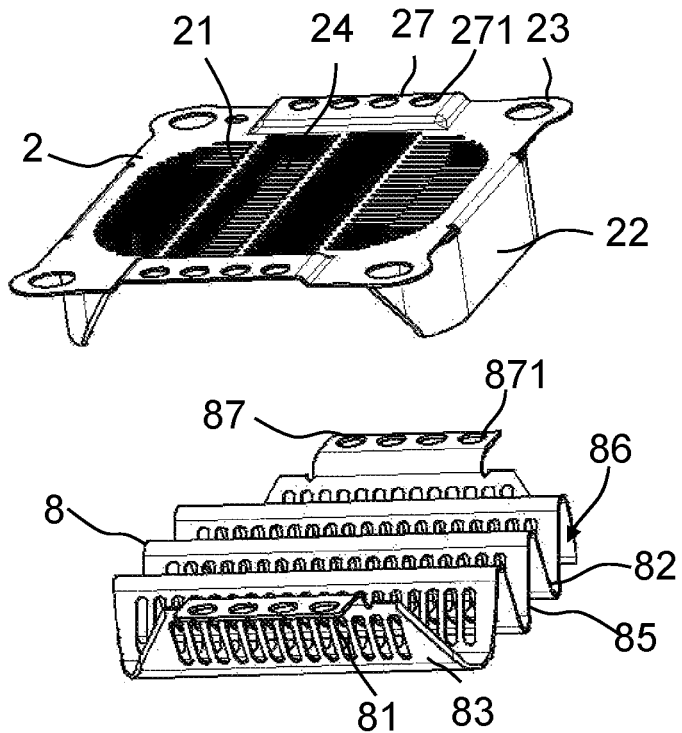
FIG. 3 shows a first filter and a second filter of the battery degassing unit according to FIG. 1 in isometric illustration according to a first embodiment of the invention.
Figure 4:
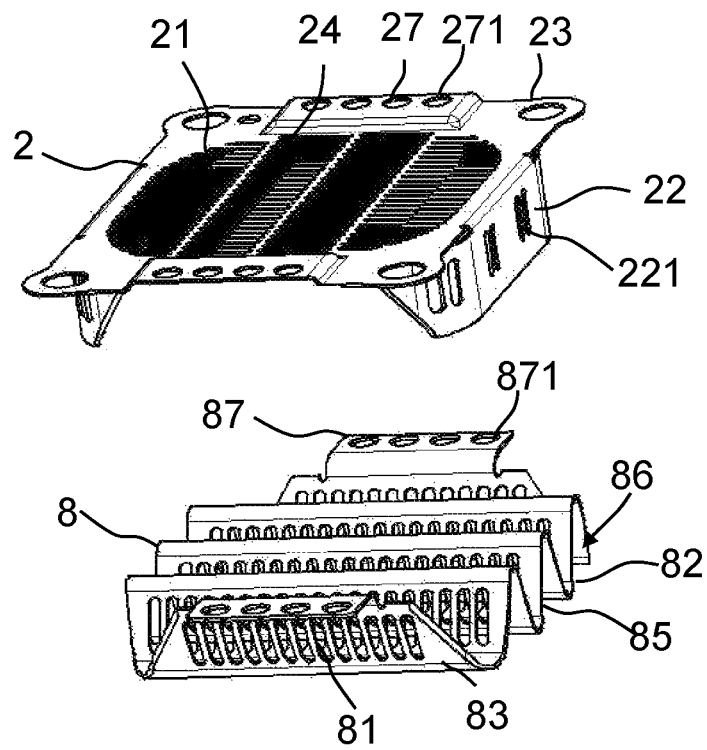
FIG. 4 shows a first filter and a second filter of the battery degassing unit according to FIG. 1 in isometric illustration according to a further embodiment of the invention.

In FIGS. 3 and 4, a first filter 8 and a second filter 2 of the battery degassing unit 10 according to FIG. 1 are illustrated, respectively, in isometric illustration for two embodiments.

Figure 5:
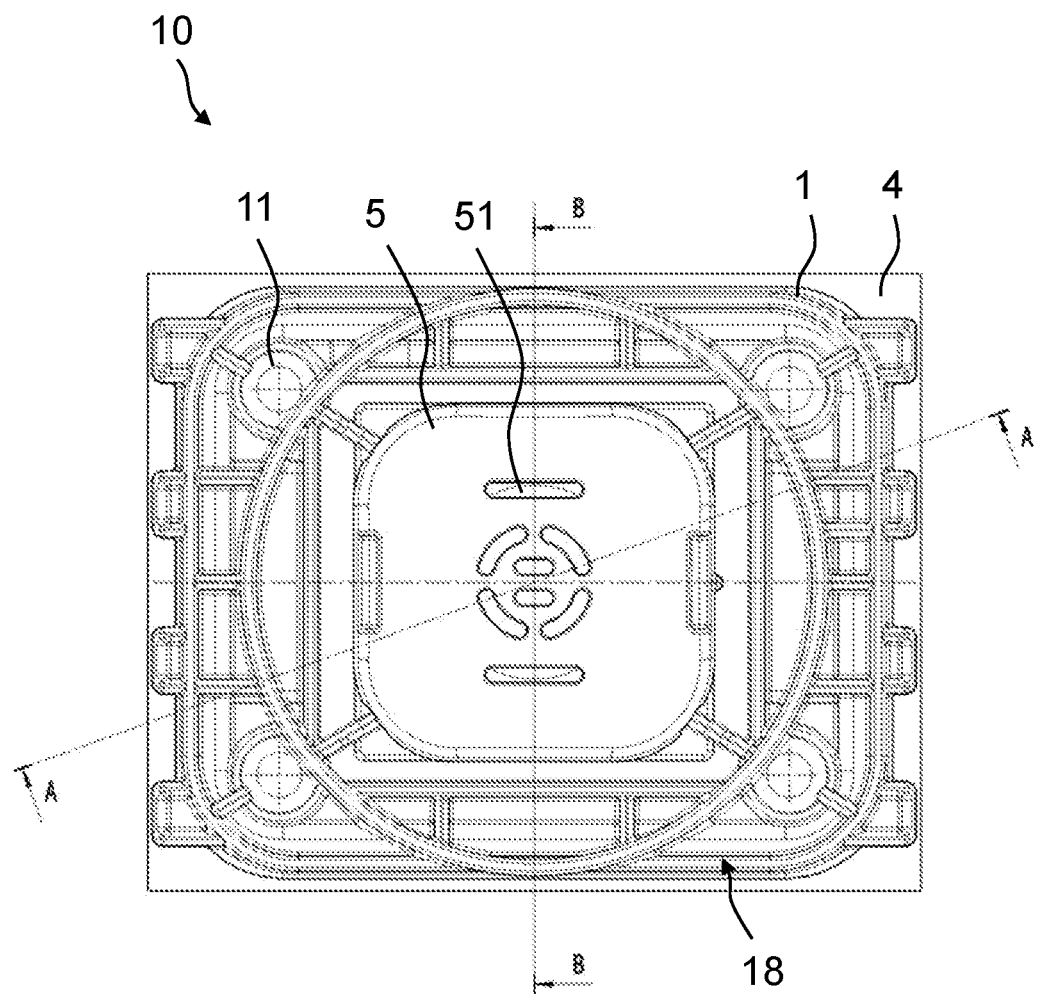
FIG. 5 shows a plan view of the battery degassing unit according to FIG. 1 viewed from an outer side of the base body with indicated section planes A-A and B-B.
Figure 6:
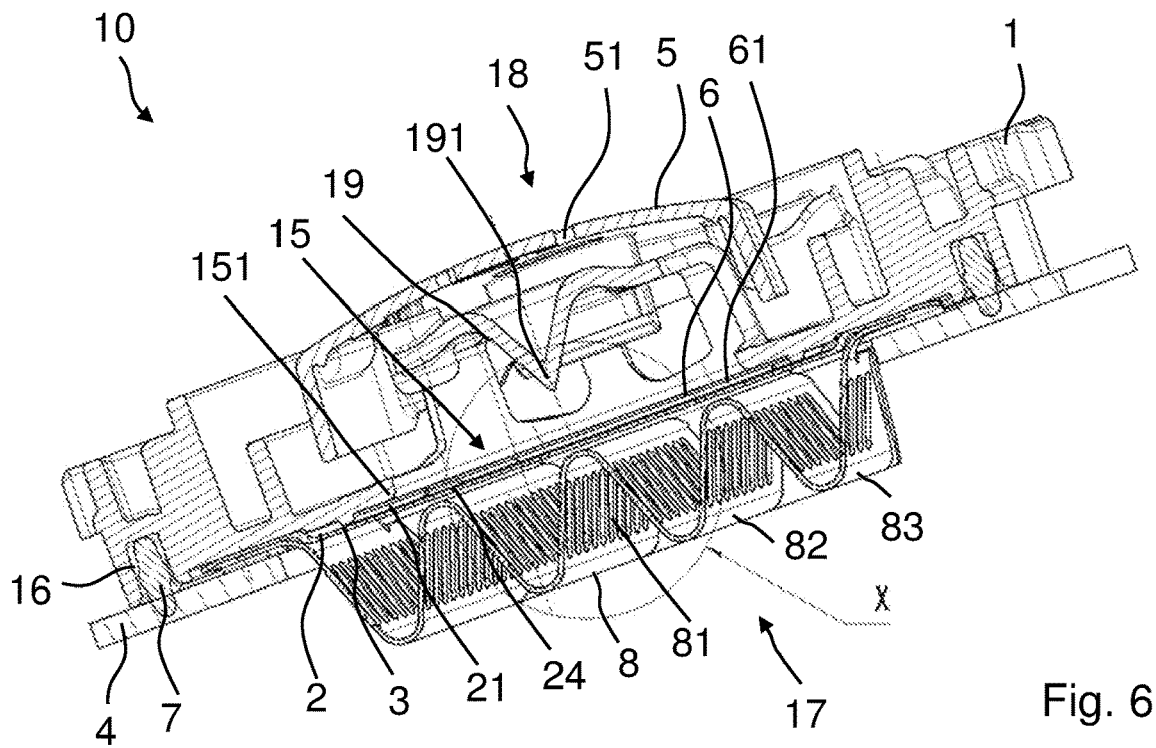
FIG. 6 shows a longitudinal section of the battery degassing unit according to FIG. 1 along the section plane A-A.
Figure 7:
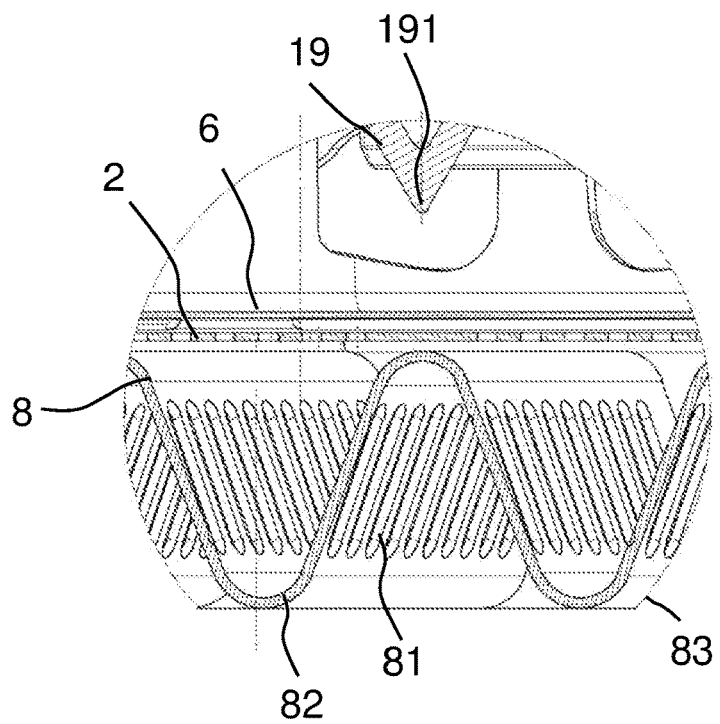
FIG. 7 shows an enlarged detail X of the longitudinal section according to FIG. 6.
Figure 8:
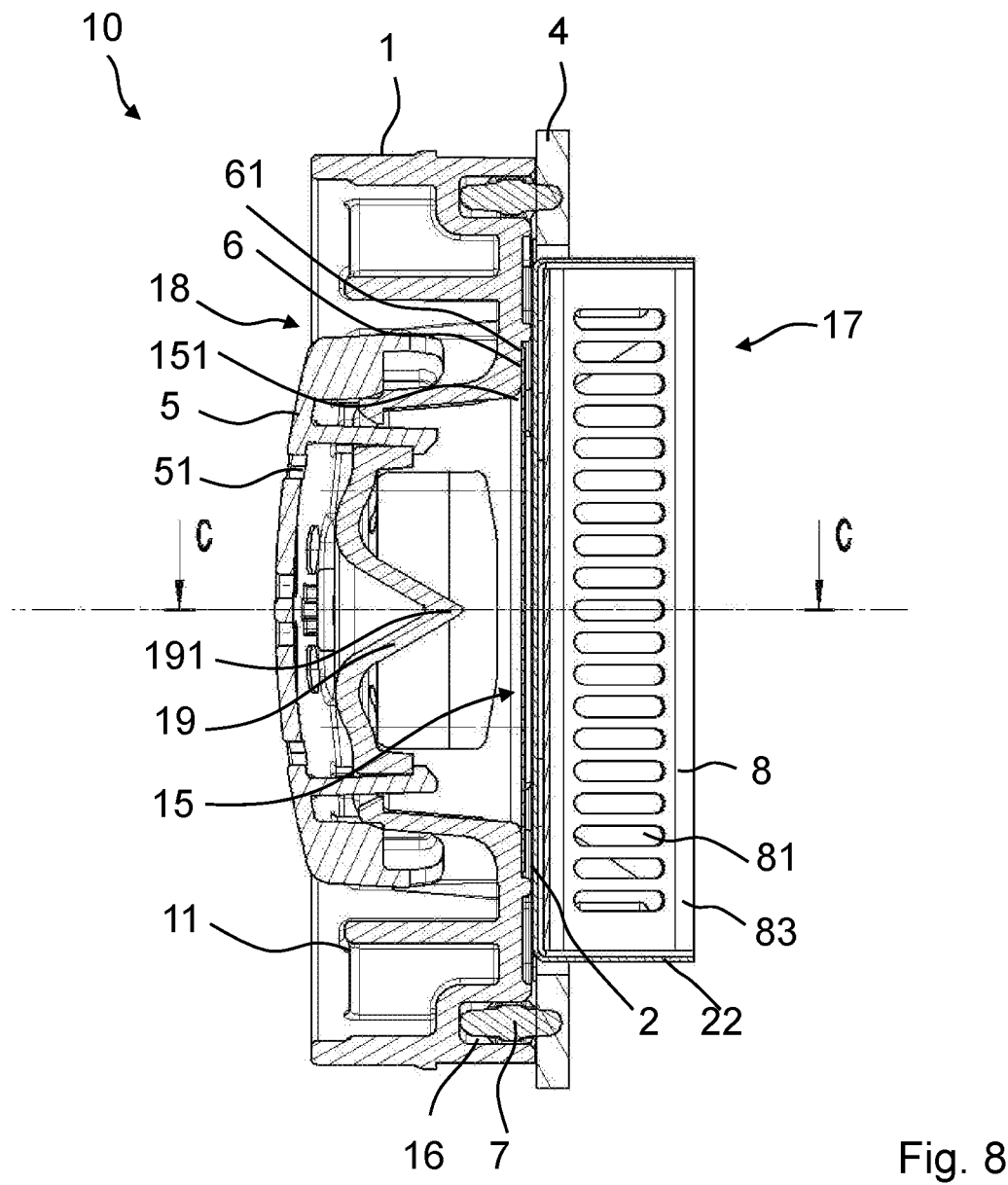
FIG. 8 shows a longitudinal section of the battery degassing unit according to FIG. 1 along the section plane B-B.
Figure 9:
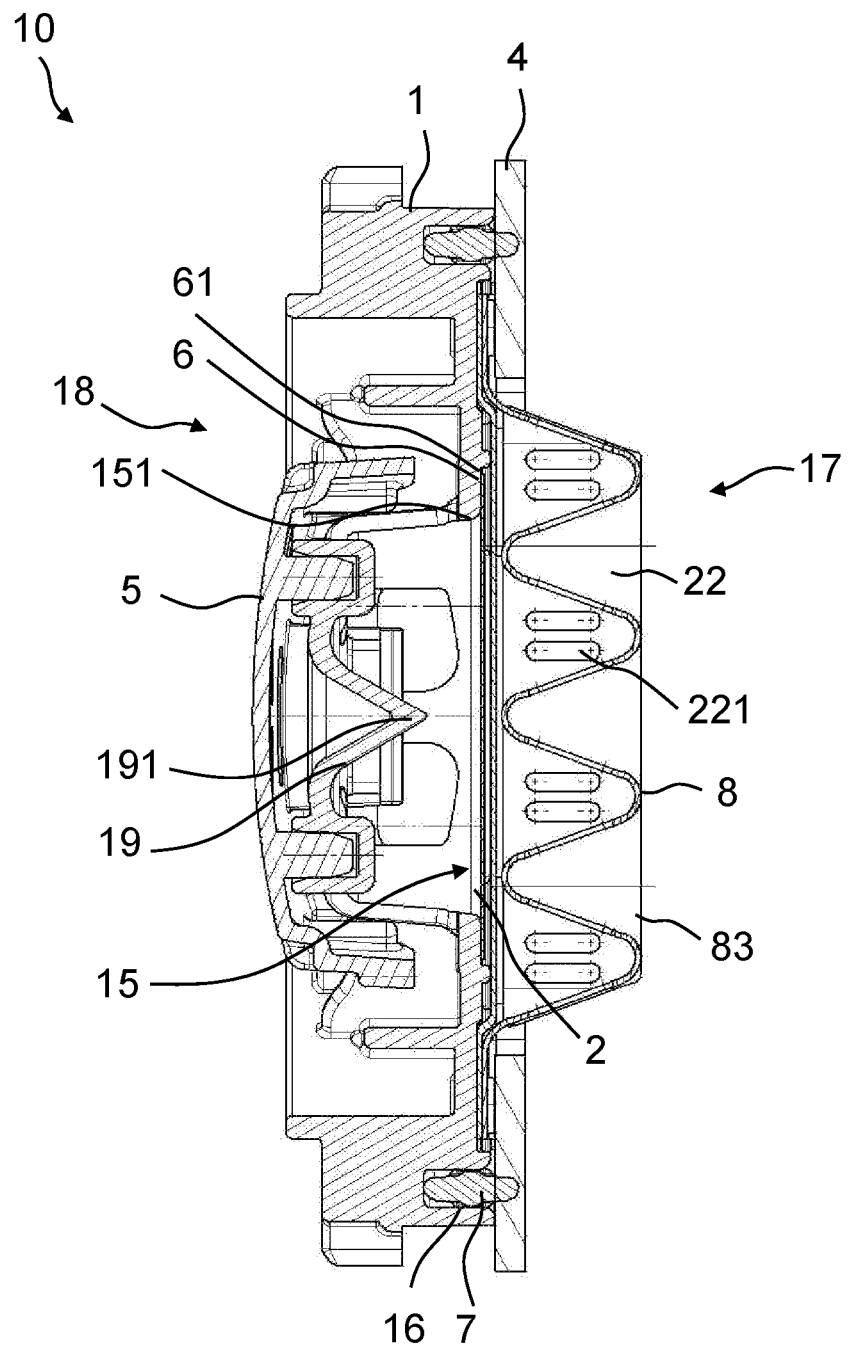
FIG. 9 shows a longitudinal section of the battery degassing unit according to FIG. 1 along the section plane C-C.

FIG. 5 shows a plan view of the battery degassing unit 10 according to FIG. 1, viewed from an outer side 18 of the base body 1, with indicated section planes A-A and B-B. FIG. 6 shows a longitudinal section of the battery degassing unit 10 along the section plane A-A and FIG. 7 an enlarged detail X of the longitudinal section according to FIG. 6. FIG. 8 shows a longitudinal section of the battery degassing unit according to FIG. 1 along the section plane B-B and FIG. 9 a longitudinal section of the battery degassing unit according to FIG. 1 along the section plane C-C.

The battery degassing unit 10 comprises a base body 1 which is connected by a screw connection externally to a rim of a pressure compensation opening of a battery housing, in particular of a battery housing of a traction battery. The screw connection comprises a plurality of screws (not illustrated) as well as corresponding fastening means regions of action 11 of the base body in which the screws are screwed in. The screws can extend respectively through the through bores of the wall 4 of the battery housing. The battery degassing unit 10 is mounted externally at the battery housing and is screw-connected from the inner side. For fluid-tight sealing of the base body 1 of the battery degassing unit 10 with the wall 4 of the battery housing, the housing seal 7 is provided which is compressed by the sealing pretensioning force that is applied by the screws. The housing seal 7 is arranged in a seal receiving groove 16 of the base body 1 and is held therein by a "bulging" cross section region so that it does not fall out during assembly.

The base body 1 has in addition a gas passage opening 15 through which a pressure compensation between housing interior and the environment as well as in reverse can take place.

Furthermore, the battery degassing unit 10 comprises a semipermeable membrane 6 which is permeable for gaseous fluids, but prevents passage of solid bodies and liquids. Preferably, the membrane is embodied as a porous PTFE film. The semipermeable membrane 6 is connected on the inner side 17 around the gas passage opening 15 of the base body 1 fluid-tightly to the base body 1, preferably welded or glued, namely to the rim 151 of the gas passage opening 15. The membrane 6 is present at the inner side 17 of the base body 1 and is at least partially engaged from behind by the second filter 2.

The gas passage opening 15 or the membrane 6 is covered furthermore by a fluid-permeable second filter 2 as a membrane support device 3 which is present at a second distance from the membrane 6. The second filter 2 has a plurality of grid stays 21 between which a plurality of grid openings 24 are present. The second filter 2 in the present embodiment is configured as a stamped sheet metal part.

At its outer side 18, a cover hood 5 is connected to the base body 1 and comprises at least one venting opening 51 and is configured to provide a protection for the sensitive membrane 6 so that the latter cannot be damaged from the exterior either by foreign bodies, for example, pointed objects such as screwdrivers or the like, or by means of high-pressure cleaners and/or steam cleaners. Construction and dimensioning of the cover hood therefore contribute significantly to a high IP protection class.

The cover hood 5 can be fastened, for example, by means of a locking element engagement to the base body 1.

Furthermore, the battery degassing unit 10 comprises a first filter 8 comprising a plurality of openings 81. The first filter 8 is positioned at a first distance from the membrane 6 that is larger than the second distance at which the second filter 2 is positioned. In addition, the openings 81 of the first filter 8 are larger than the openings 24 of the second filter 2. By means of the first filter 8, particles released from individual or several battery cells in case of a cell defect can be retained in the housing interior.

The first grid openings 81 are provided for separating larger particles and the second grid openings 24 are provided for separating smaller particles that are smaller than the larger particles. The dimensions of the second grid openings 24 of the second filter 2 in at least one direction of extension can thus be advantageously smaller than the dimensions of the first grid openings 81 of the first filter 8. The second filter 2 provides an ingress protection so that long and pointed objects (for example, wires, screwdrivers or the like) cannot be inserted into the housing interior.

The dimensions of the grid openings 81 of the first filter 8 are advantageously to be selected such that a proportion as large as possible of a particle fraction can be retained thereby in order to prevent that they can reach the environment. The dimensions of the grid openings 81 of the first filter 8 are, for example, selected such that a certain mass proportion of the particles, for example, >75%, can be retained.

The corrugated shape of the first filter 8 enlarges the surface that is available for particle separation compared to a planar configuration and reduces therefore the tendency of the first filter 8 to block for gas flows that are heavily loaded with particles. An enlarged surface of the first filter 8 has furthermore the advantage that thermal peaks are distributed across a large surface which reduces the risk of thermally caused structural damages.

The first filter 8 is connected particle-tightly to the base body, according to the illustrated embodiment, in that it is clamped sandwich-like between the wall 4 of the battery housing and the base body 1. For facilitating mounting of the battery degassing unit 10, the first filter 8 can be at least prefixed additionally in relation to the base body 1; for this purpose, all connection types (for example, gluing) that appear suitable to a person of skill in the art are conceivable.

The base body 1 comprises moreover an emergency degassing spike 19. It extends toward the membrane 6 and is arranged in the rest state (no differential pressure load) at a certain distance from the outer membrane surface 61. Under pressure load (relative inner excess pressure), the membrane 6 will bulge in the direction toward the exterior space and, when reaching a limit pressure, will contact the tip 191 of the emergency degassing spike 19. Due to its tip 191, the emergency degassing spike 19 then produces a targeted weakening of the membrane 6 so that the latter will rupture. This serves for ensuring an emergency degassing function that reacts as quickly as possible, which is important in order to be able to ensure that the housing structure remains intact in case of a sudden inner pressure increase in the battery housing. By a variation of the distance of the tip 191 of the emergency degassing spike 19 from the membrane surface 61, the emergency degassing pressure is adjustable.

At least one of the two filters 2, 8 (in the embodiments illustrated in the Figures, this is the first filter 8, respectively) can advantageously be corrugated such that a length extension 9 (see FIG. 2) in the stretched state in at least one direction is at least 1.3 times as large as in the corrugated state. Alternatively, the second filter 2 can be corrugated also.

The corrugated filter 8 is at least in sections thereof surrounded by side walls 22 which are formed at the second filter 2 as side walls 22 which are oriented toward the inner side 17 and project perpendicularly and which cover lateral openings 86 (see FIG. 4) of the corrugated filter 8, which are formed especially at the end face edges 85 of the folds 82, toward the battery housing.

In FIG. 3, an embodiment of the side walls 22 at the second filter 2 is illustrated in which the side walls 22 are of a continuous configuration, i.e., have no filter function, while in FIG. 4 an embodiment is illustrated in which the side walls 22 have openings 221 which enable at least passage of gas.

The corrugated filter 8 comprises folds 82 arranged in parallel to each other whose fold edges (i.e., fold tips and fold bases) are arranged parallel to the gas passage opening 15.

The first filter 8 is connected particle-tightly to the base body 1. In this context, a surface area which is spanned by the first filter 8 is larger than the cross section of the gas passage opening 15.

The dimensions of the grid openings 81 of the first filter 8 in at least one direction of extension can be smaller than 3.0 mm, preferably smaller than 2.0 mm, more strongly preferred smaller than 1.5 mm.

The first filter 8 can comprise, for example, a filter medium 83 that is preferably a grid material, in particular a wire mesh, and/or a nonwoven material. Preferably, the filter medium 83 in this context can comprise or can be comprised of a metallic material.

The first filter 8 can be connected together with the second filter 2 to the base body 1. For this purpose, the first filter 8 can comprise at least one fastening tab 87 with bores 871 which extends preferably laterally and which is suitable to connect the first filter 8 directly to the base body 1 by means of weld spots 12. In this manner, the first filter 8 can be connected by means of the fastening tabs 87, for example, by ultrasonic welding, friction stir welding or similar welding methods, to the fastening tabs 27 of the second filter 2. The fastening tabs 27, 87 comprise for this purpose bores 271, 871 through which, for example, weld spots 12 arranged in the base body 1 can be pushed through and connected to the fastening tabs 27, 87 of the two filters 2, 8, in particular welded.

Alternatively, it is also possible that the first filter 8 is snapped onto the second filter 2.

A distance between the first filter 8 and the second filter 2 in the region of the center of the gas passage opening 15 can amount beneficially to 0.2 mm, preferably at least 0.7 mm.

The first filter 8 can beneficially be embodied as a sheet metal part, in particular stamped sheet metal part. Alternatively, the first filter 8 can also be configured of a plastic material with a very high melting point.

Figure 10:
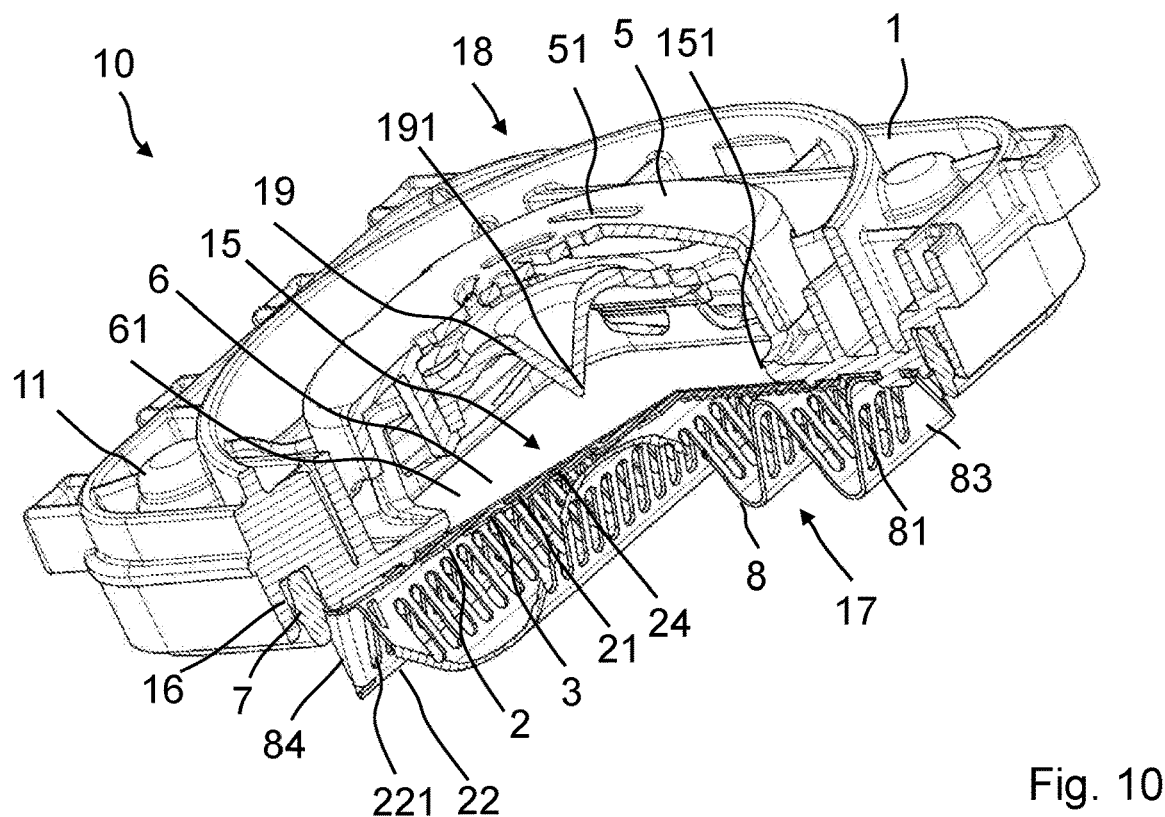
FIG. 10 shows an isometric section view of a battery degassing unit according to a further embodiment of the invention.
Figure 11:
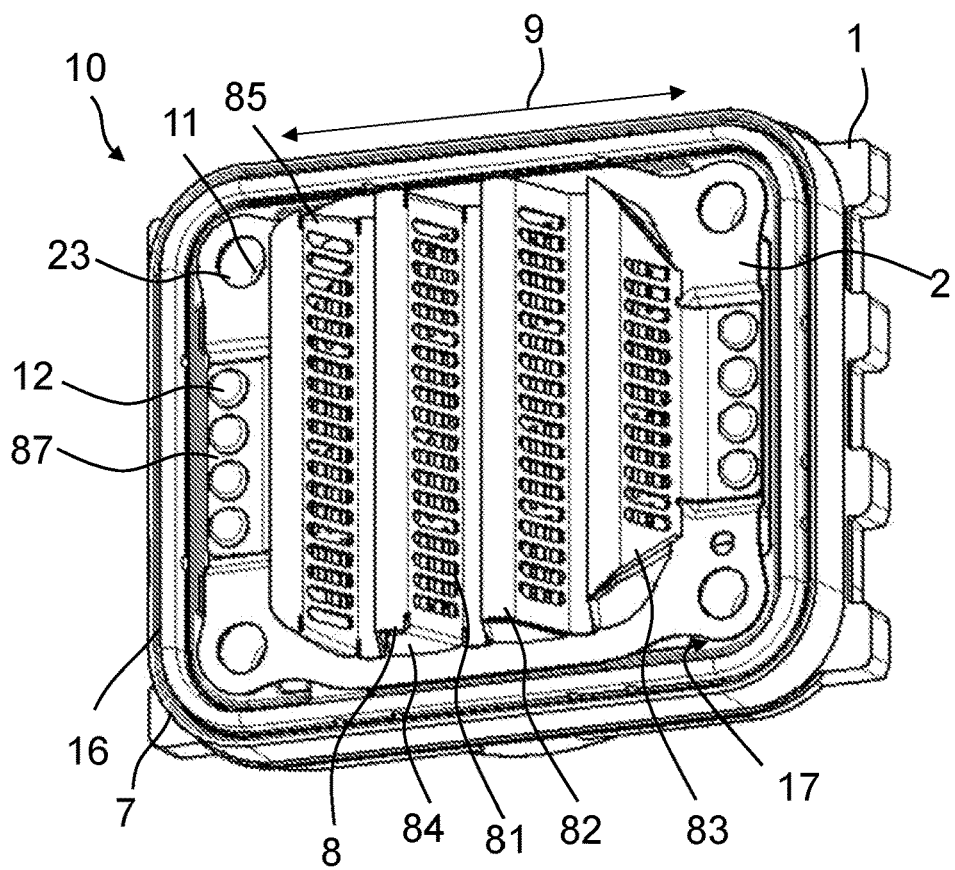
FIG. 11 shows an isometric view of the battery degassing unit according to FIG. 10 viewed from an inner side of the base body.

In FIGS. 10 to 17, a further embodiment of a battery degassing unit 10 is illustrated. FIG. 10 shows an isometric section view of the battery degassing unit 10 while in FIG. 11 an isometric view, viewed from an inner side of the base body, is illustrated.

FIG. 12 shows a first filter 8 and a second filter 2 of the battery degassing unit 10 in isometric illustration.

Figure 14:
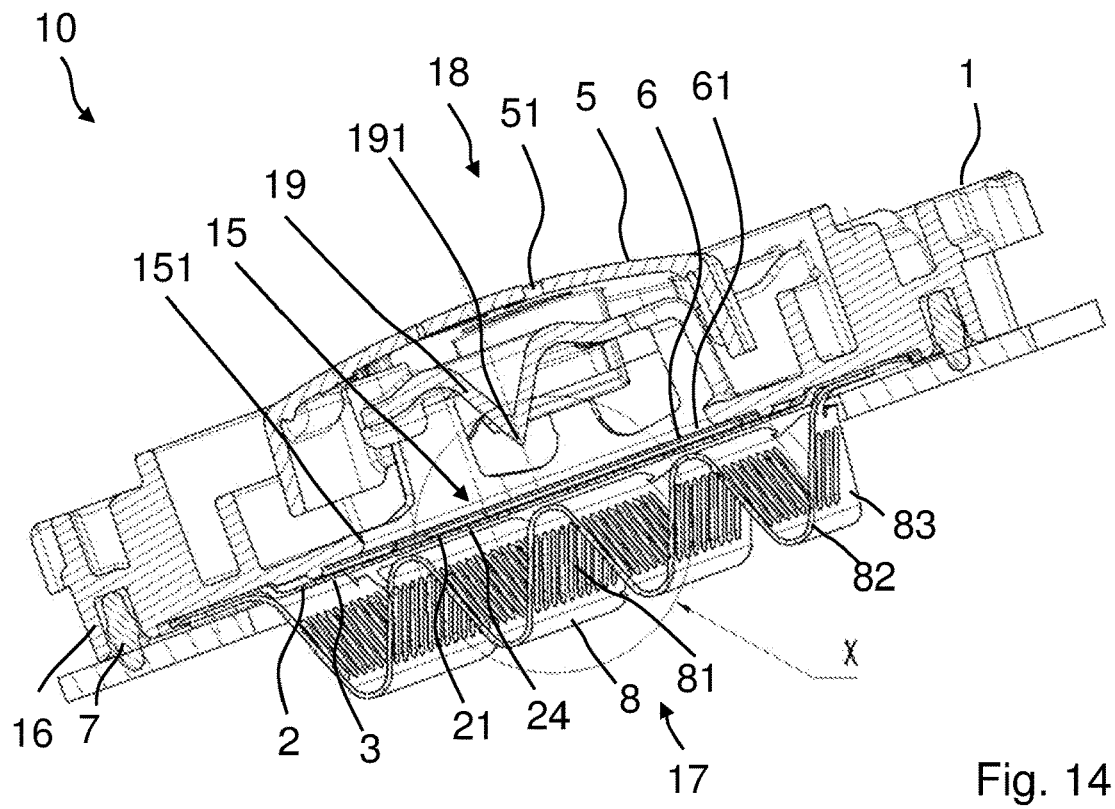
FIG. 14 shows a longitudinal section of the battery degassing unit according to FIG. 10 along the section plane A-A.
Figure 15:
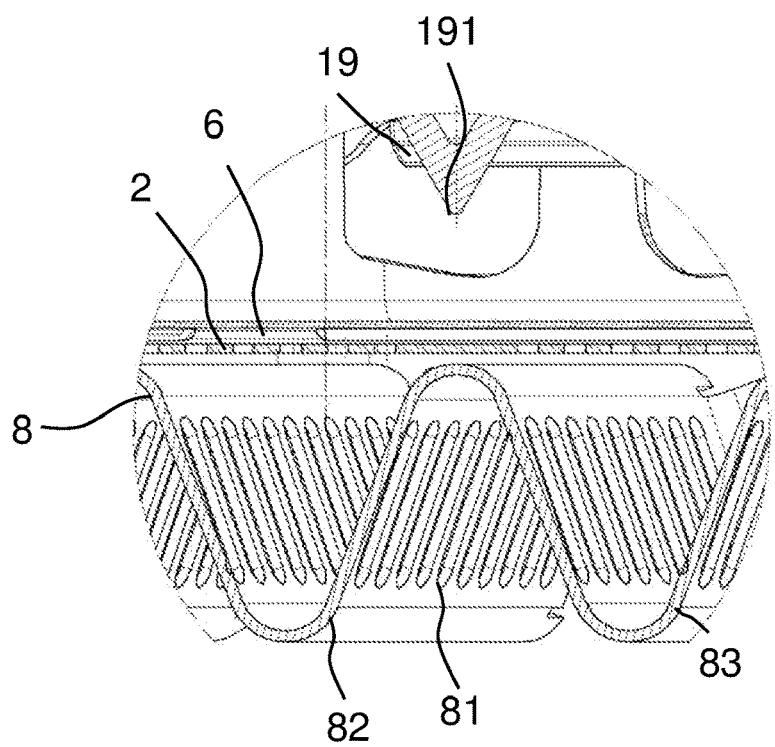
FIG. 15 shows an enlarged detail X of the longitudinal section according to FIG. 14.
Figure 16:
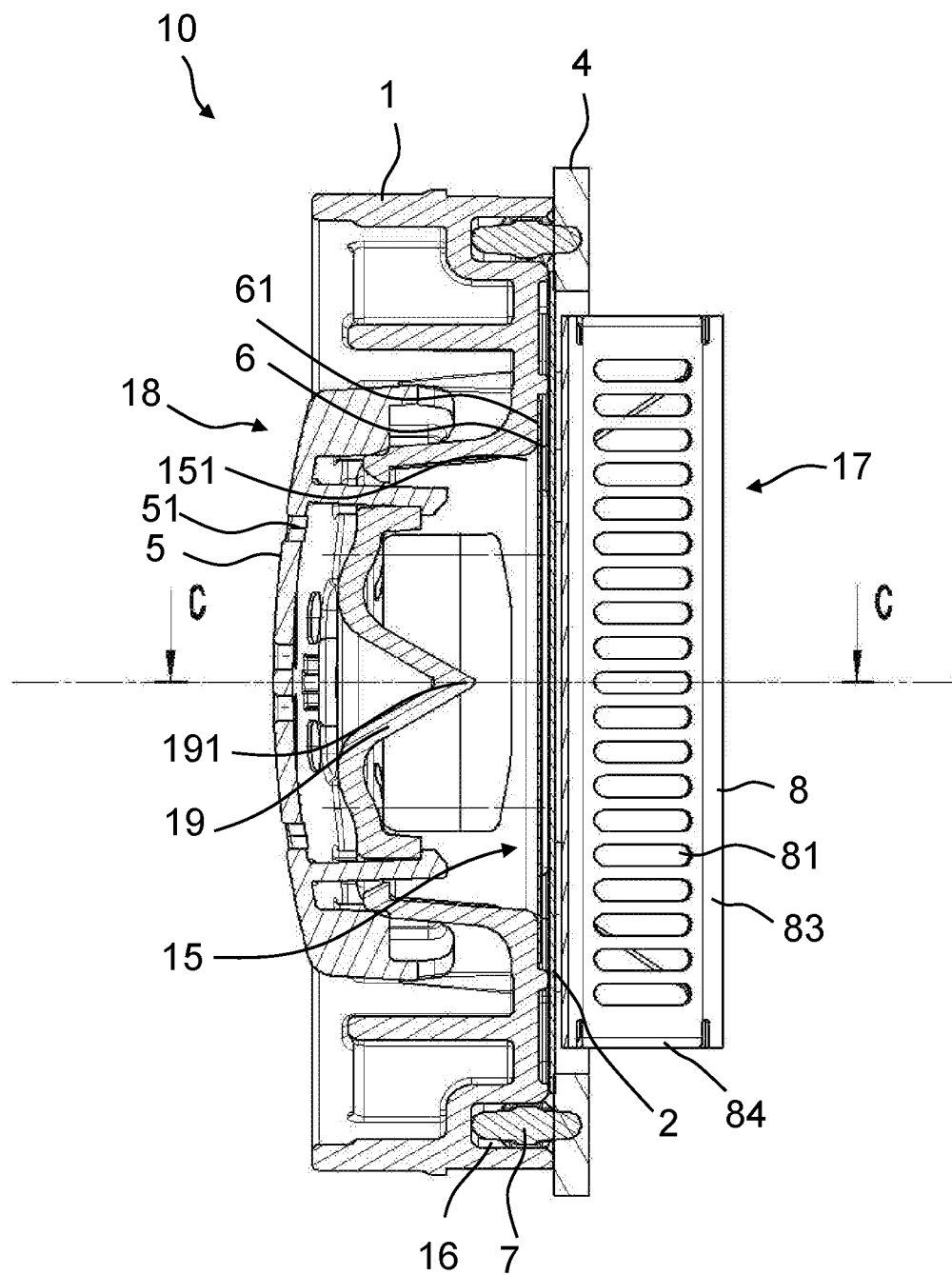
FIG. 16 shows a longitudinal section of the battery degassing unit according to FIG. 10 along the section plane B-B.
Figure 17:
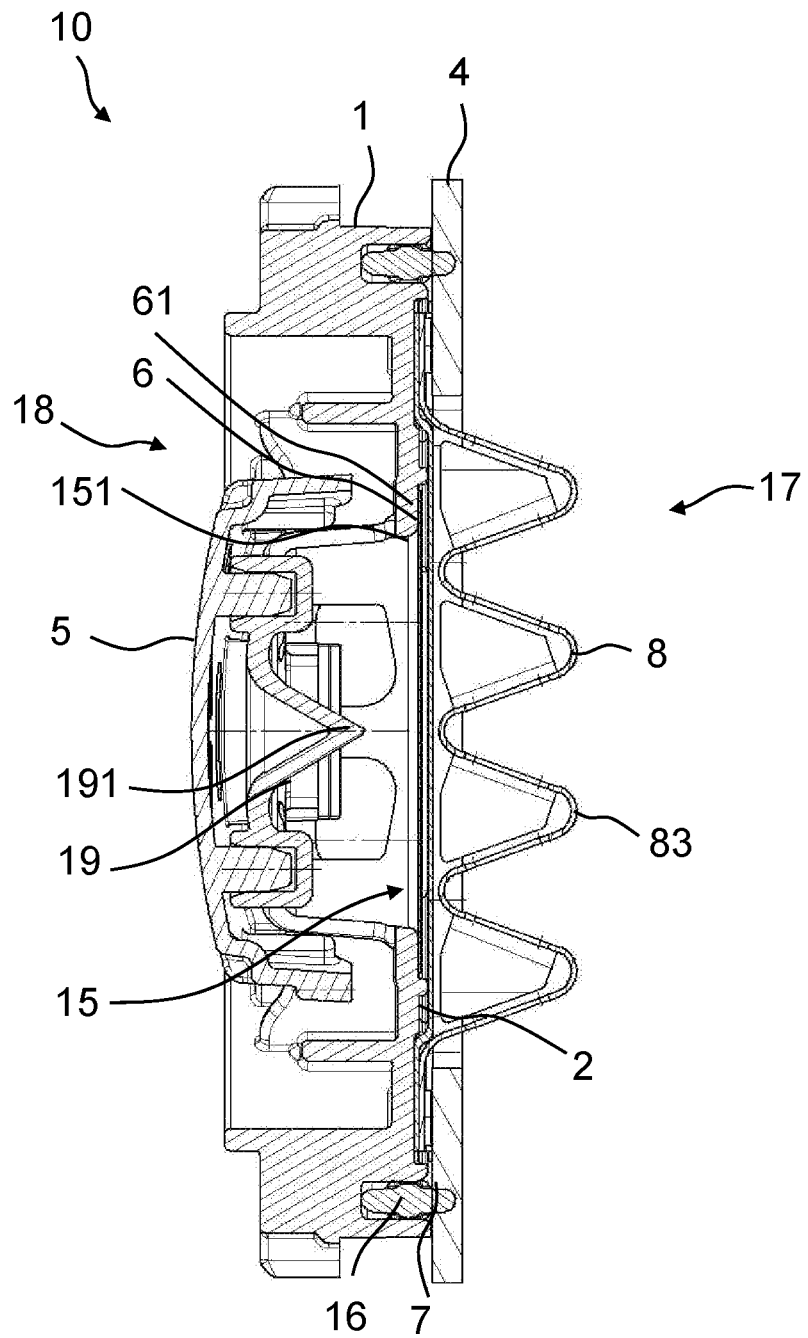
FIG. 17 shows a longitudinal section of the battery degassing unit according to FIG. 10 along the section plane C-C.

FIG. 13 shows a plan view of the battery degassing unit 10 according to FIG. 10, viewed from an outer side 18 of the base body 1, with indicated section plane A-A and B-B, while in FIG. 14 a longitudinal section of the battery degassing unit 10 along the section plane A-A and in FIG. 15 an enlarged detail X of the longitudinal section is illustrated. FIG. 16 shows a longitudinal section of the battery degassing unit 10 along the section plane B-B and FIG. 17 a longitudinal section of the battery degassing unit 10 along the section plane C-C.

The principal configuration of the embodiment illustrated in FIGS. 10 to 17 of the battery degassing unit 10 corresponds largely to the embodiment illustrated in FIGS. 1 to 9. Therefore, only the difference between the two embodiments will be discussed for reasons of unnecessary repetitions.

The significant difference resides in that the side walls 84 of the corrugated filter 8 at least in sections are formed at the first filter 8 itself. Essentially, it can be seen in FIGS. 11 and 12 that the side walls 84 are formed of the filter medium 83 of the first filter 8 by suitable folding of the filter medium 83.

The side walls 84 are formed continuously, i.e., do not provide a filter function. Alternatively, it would also be possible to provide further openings in the side walls 84 so that here also at least a passage of gas would be possible.

The second filter 2 can therefore be configured flat (see FIG. 12). The first filter 8, as in the afore described embodiment, can be connected by means of fastening tabs 87 to the corresponding fastening tabs 27 of the second filter 2, for example, by ultrasonic welding, friction stir welding or similar welding methods. Alternatively, the two filters 2, 8 can also be connected by a snap-on connection.

In an alternative embodiment, not illustrated, of the battery degassing unit 10, the side walls 22, 84 at least in sections can be formed at the base body 1. In this case, the side walls 22, 84 can be formed as one piece together with the base body 1 and, for example, can be directly integrally formed thereat by an injection molding process.

Figure 18:
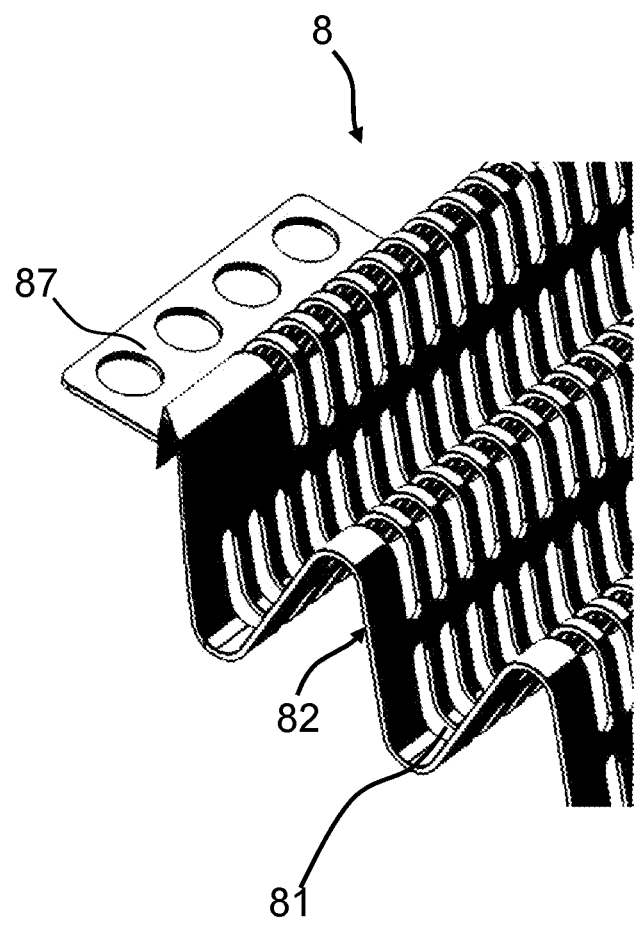
FIG. 18 shows an isometric view of a first filter for a battery degassing unit according to the invention.

In FIG. 18, a first filter 8 for a battery degassing unit according to the present invention is shown that is compatible with all herein described embodiments. The first filter 8 has multiple corrugations and comprises folds 82. The grid openings 81 are present herein also in the regions in which the cross section of the first filter 8 experiences an inversion of direction, i.e., in the region of the respective fold bases and/or fold tips of the folds 82. In addition, the fold surfaces that are not bent or curved are also provided with grid openings 81. This entails the technical advantage that these regions can be used additionally for filtration, which increases the effective separation surface.

REFERENCE CHARACTERS

10 battery degassing unit
1 base body
11 fastening means region of action
12 weld spot
15 gas passage opening
151 rim of gas passage opening
16 seal receiving groove of the base body
17 inner side of the base body
18 outer side of the base body
19 emergency degassing spike
191 tip of the emergency degassing spike
2 second filter
21 grid stays
22 side wall
221 side wall opening
23 bore
24 grid openings
27 fastening tab
271 bore of the fastening tab
3 membrane support device
4 wall of the battery housing
5 cover hood
51 venting openings
6 semipermeable membrane
61 outer membrane surface
7 housing seal
8 first filter
81 grid openings
82 fold
83 filter medium
84 side wall
85 end face edge
86 opening
87 fastening tab
871 bore of the fastening tab
9 length extension

What is claimed is:

1. A battery degassing unit for a battery housing, the battery degassing unit comprising:
- a base body configured to be connected fluid-tightly to a rim of a pressure compensation opening of the battery housing and comprising a gas passage opening;
- a first filter covering the gas passage opening at an inner side of the base body, the first filter being configured as a separation grid and comprising first grid openings; and
- a second filter arranged between the first filter and the inner side of the base body, the second filter being configured as a separation grid and comprising second grid openings,
- wherein the first filter is corrugated and comprises folds arranged in parallel to each other, the folds comprising fold edges arranged parallel to a plane of the gas passage opening,
- the first filter further comprises lateral openings arranged at end face edges of the folds, the lateral openings being open toward the battery housing, and
- the second filter further comprises side walls projecting from the second filter to the first filter and covering only the lateral openings of the first filter.

2. The battery degassing unit according to claim 1, wherein the side walls comprise openings enabling at least a passage of gas.

3. The battery degassing unit according to claim 1, wherein the first grid openings are configured to separate larger particles, and
- the second grid openings are configured to separate smaller particles that are smaller than the larger particles.

4. The battery degassing unit according to claim 1, further comprising a semipermeable membrane arranged adjacent to the second filter and facing toward an outer side of the battery degassing unit, the semipermeable membrane configured to:
- enable a passage of gaseous media from an environment into the battery housing and in reverse; and
- prevent a passage of liquid media and/or solids.

5. The battery degassing unit according to claim 4, wherein the second filter is configured as a membrane support device supporting the semipermeable membrane.

6. The battery degassing unit according to claim 4, wherein the semipermeable membrane is located at the inner side of the base body and is at least partially engaged from behind by the second filter.

7. The battery degassing unit according to claim 4, further comprising an emergency degassing spike that extends externally in an axial direction toward the semipermeable membrane,
- wherein the emergency degassing spike comprises a tip positioned in a rest state at a predetermined distance from an outer membrane surface of the semipermeable membrane.

8. The battery degassing unit according to 7, wherein the emergency degassing spike is formed at the base body or at a cover hood of the battery degassing unit.

9. The battery degassing unit according to claim 1, wherein the first filter is connected particle-tightly to the base body.

10. The battery degassing unit according to claim 9, wherein a surface area that is spanned by the first filter is larger than a cross section of the gas passage opening.

11. The battery degassing unit according to claim 1, wherein a surface area that is spanned by the first filter is larger than a cross section of the gas passage opening.

12. The battery degassing unit according to claim 1, wherein dimensions of the first grid openings in at least one direction of extension of the first grid openings are smaller than 3.0 mm.

13. The battery degassing unit according to claim 1, wherein dimensions of the second grid openings in at least one direction of extension of the second grid openings are smaller than dimensions of the first grid openings.

14. The battery degassing unit according to claim 1, wherein the first filter comprises a filter medium comprising a grid material and/or a nonwoven material.

15. The battery degassing unit according to claim 14, wherein the grid material is a wire mesh.

16. The battery degassing unit according to claim 14, wherein the filter medium comprises, or is comprised of, a metallic material.

17. The battery degassing unit according to claim 1, wherein the first filter is connected to the second filter.

18. The battery degassing unit according to claim 17, wherein the first filter is welded to the second filter or is snapped onto the second filter.

19. The battery degassing unit according to claim 1, wherein a distance between the first filter and the second filter in a region of a center of the gas passage opening amounts to at least 0.2 mm.

20. The battery degassing unit according to claim 1, wherein the first filter is a sheet metal part.

21. The battery degassing unit according to claim 20, wherein the sheet metal part is a stamped sheet metal part.

22. The battery degassing unit according to claim 1, wherein the first filter comprises at least one fastening tab configured to connect the first filter to the base body.

23. The battery degassing unit according to claim 1, wherein a direction in which the second grid openings have a greatest dimension is positioned at an angle to a direction in which the first grid openings have a greatest dimension.

24. The battery degassing unit according to claim 23, wherein the angle amounts to 90°.

25. A battery housing comprising:
- at least one housing wall comprising a pressure compensation opening;
- a battery degassing unit according to claim 1 arranged at the at least one housing wall and closing the pressure compensation opening.

* * * * *